(12) United States Patent
Luo

(10) Patent No.: US 11,995,254 B2
(45) Date of Patent: May 28, 2024

(54) METHODS, DEVICES, APPARATUSES, AND STORAGE MEDIA FOR MAPPING MOUSE MODELS FOR COMPUTER MOUSES

(71) Applicant: Beijing Source Technology Co., Ltd., Beijing (CN)

(72) Inventor: Zixiong Luo, Beijing (CN)

(73) Assignee: Beijing Source Technology Co., Ltd., Beijing (CN)

( * ) Notice: Subject to any disclaimer, the term of this patent is extended or adjusted under 35 U.S.C. 154(b) by 0 days.

(21) Appl. No.: 18/176,249

(22) Filed: Feb. 28, 2023

(65) Prior Publication Data
US 2023/0325009 A1 Oct. 12, 2023

(30) Foreign Application Priority Data

Feb. 28, 2022 (CN) .......................... 202210187245.4

(51) Int. Cl.
*G06F 3/038* (2013.01)
*G06F 3/0346* (2013.01)
*G06F 3/0354* (2013.01)

(52) U.S. Cl.
CPC ............ *G06F 3/038* (2013.01); *G06F 3/0346* (2013.01); *G06F 3/03543* (2013.01)

(58) Field of Classification Search
CPC ........ G06F 3/011; G06F 3/038; G06F 3/0346; G06F 3/03543
See application file for complete search history.

(56) References Cited

U.S. PATENT DOCUMENTS

| | | | |
|---|---|---|---|
| 10,606,343 B2* | 3/2020 | Veeramani | ............... G06F 3/017 |
| 10,943,402 B2* | 3/2021 | Gutierrez | ............ G06F 3/04815 |
| 11,182,962 B2* | 11/2021 | Gutierrez | ................ G06F 3/011 |
| 2018/0284982 A1* | 10/2018 | Veeramani | ............ G06F 3/0426 |

(Continued)

FOREIGN PATENT DOCUMENTS

| | | |
|---|---|---|
| CN | 105068679 A | 11/2015 |
| CN | 112486321 A | 3/2021 |

(Continued)

OTHER PUBLICATIONS

International Searching Authority (ISA/CN), International Search Report for PCT/CN2023/078398, dated May 23, 2023, 6 pages (with English translation).

(Continued)

*Primary Examiner* — Michael Pervan
(74) *Attorney, Agent, or Firm* — Jaffery Watson Mendonsa & Hamilton LLP

(57) ABSTRACT

The present disclosure relates to methods, devices, apparatuses, and storage media for mapping mouse models for computer mouses. A method according to the present disclosure may include: determining target information of a mouse model corresponding to the mouse in a virtual reality system, using the target information as initial target information; receiving movement data of the mouse in real time, the movement data including a movement distance and a movement direction of the mouse; updating the target information of the mouse model in the virtual reality system according to the movement data of the mouse; and displaying the mouse model at the updated target information in a virtual reality scene.

10 Claims, 4 Drawing Sheets

(56) References Cited

U.S. PATENT DOCUMENTS

| | | |
|---|---|---|
| 2019/0227693 A1 | 7/2019 | Liao |
| 2019/0295322 A1* | 9/2019 | Gutierrez ........... G02B 27/0179 |
| 2019/0295323 A1* | 9/2019 | Gutierrez ................. G06T 7/70 |
| 2020/0264698 A1* | 8/2020 | Veeramani ............ G06F 3/0304 |

FOREIGN PATENT DOCUMENTS

| | | |
|---|---|---|
| CN | 114706489 A | 7/2022 |
| CN | 114706490 A | 7/2022 |

OTHER PUBLICATIONS

International Searching Authority (ISA/CN), Written Opinion for PCT/CN2023/078398, dated May 23, 2023, 8 pages (with English translation).

* cited by examiner

METHODS, DEVICES, APPARATUSES, AND STORAGE MEDIA FOR MAPPING MOUSE MODELS FOR COMPUTER MOUSES

CROSS-REFERENCE TO RELATED APPLICATION

This application claims the benefits of Chinese Patent Application No. 202210187245.4, filed on Feb. 28, 2022, which is hereby incorporated by reference in its entirety.

TECHNICAL FIELD

The present disclosure relates to the technical field of data, and more particularly, to a model mapping method and apparatus of a mouse, a device, and a storage medium.

BACKGROUND

At present, virtual scenes are widely used, and a physical device may be virtualized in a virtual scene. The existing methods usually use a camera to capture various images of a mouse, such as color or gray level, and then determine a model of the mouse and locate the mouse through image recognition. However, when the camera or the mouse is blocked, a recognition result is easily affected, and the recognition may even fail. Alternatively, it is usually possible to install a positioning apparatus on the mouse, but this method requires the positioning apparatus to be installed on the mouse first, which makes it impossible to use the mouse conveniently and quickly.

SUMMARY

To solve the above-mentioned technical problem or at least partially solve the above-mentioned technical problem, the present disclosure provides a model mapping method and apparatus of a mouse, a device, and a storage medium, which can accurately map a mouse in a reality space into a virtual reality scene, thereby facilitating to subsequently perform an interactive operation by using the mouse according to a mouse model in the virtual reality scene.

According to a first aspect, the embodiments of the present disclosure provide a method for mapping a mouse model, including:
  determining target information of a mouse model corresponding to the mouse in a virtual reality system;
  receiving movement data of the mouse;
  updating the target information of the mouse model in the virtual reality system according to the movement data; and
  mapping the mouse model into a virtual reality scene corresponding to the virtual reality system based on the updated target information.

According to a second aspect, the embodiments of the present disclosure provide an apparatus for model mapping for a mouse, including:
  a determination unit configured to determine target information of a mouse model corresponding to the mouse in a virtual reality system;
  a receiving unit configured to receive movement data of the mouse;
  an updating unit configured to update the target information of the mouse model in the virtual reality system according to the movement data; and
  a mapping unit configured to map the mouse model into a virtual reality scene corresponding to the virtual reality system based on the updated target information.

According to a third aspect, the embodiments of the present disclosure provide an electronic device, including:
  a memory;
  a processor; and
  a computer program;
  wherein the computer program is stored in the memory and is configured to be executed by the processor to execute the method of model mapping for a computer mouse as mentioned above.

According to a fourth aspect, the embodiments of the present disclosure provide a computer readable storage medium storing a computer program thereon, wherein the program, when being executed by a processor, implements the steps of the method for model mapping for a mouse as mentioned above.

According to a fifth aspect, the embodiments of the present disclosure provides a computer program product including a computer program or instruction, wherein the computer program or instruction, when executed by a processor, implements the method of mapping the mouse model for the computer mouse as mentioned above.

According to the method for mapping the mouse model in accordance with some embodiments of the present disclosure, by acquiring the data related to the mouse, the relevant data specifically including the configuration information of the mouse, input signals corresponding to elements on the mouse, the image of the mouse and the like, the target information of the mouse model corresponding to the mouse in the virtual reality system can be determined based on the data related to the mouse, wherein the target information may be regarded as the initial target information. In this case, the movement data generated when the mouse moves may be received in real time, and the movement data includes the movement distance and the movement direction of the mouse. Finally, the target information of the mouse model in the virtual reality system is updated according to the movement data of the mouse, and the mouse model is displayed in the virtual reality scene at the updated target information. The method for mapping the mouse model provided by the present disclosure can accurately map the mouse in the real space into the virtual reality scene, thereby facilitating the user to subsequently perform the interactive operation according to the mouse model in the virtual reality scene effectively.

BRIEF DESCRIPTION OF THE DRAWINGS

The accompanying drawings herein are incorporated into the specification and constitute a part of the specification, show the embodiments consistent with the present disclosure, and serve to explain the principles of the present disclosure together with the specification.

In order to illustrate the technical solutions in the embodiments of the present disclosure or the prior art more clearly, the accompanying drawings to be used in the description of the embodiments or the prior art will be briefly described below. Obviously, those of ordinary skills in the art can also obtain other drawings based on these drawings without going through any creative work.

DETAILED DESCRIPTION

In order to better understand the above objects, features and advantages of the present disclosure, the solutions provided by the present disclosure will be further described below. It should be noted that, in case of no conflict, the embodiments in the present disclosure and the features in the embodiments may be mutually combined with each other.

In the following description, many specific details are set forth to fully understand the present disclosure, but the present disclosure may be implemented in other ways different from those described herein. Obviously, the embodiments described in the specification are merely a part of, rather than all of, the embodiments of the present disclosure.

Figure 1:
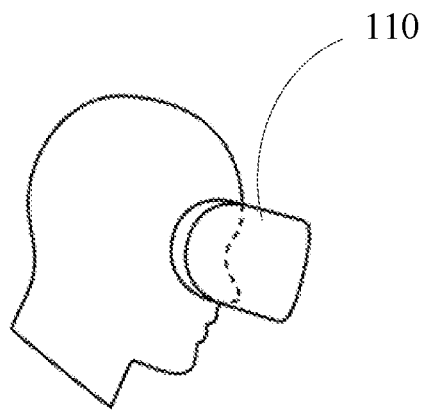
FIG. 1 is a schematic diagram of an application scene in accordance with some embodiments of the present disclosure.

A virtual reality system includes a head-mounted display and a virtual reality software system. The virtual reality software system includes an operating system, a software algorithm for image recognition, a software algorithm for spatial calculation and rendering software for rendering a virtual scene (the rendered virtual scene is displayed on a display screen of the head-mounted display), wherein the virtual reality software system may be configured on the head-mounted display, and the head-mounted display may be directly connected to a camera and a mouse, which may be regarded as an all-in-one machine. The virtual reality software system may also be configured on a host connected to the head-mounted display, and the camera and mouse are connected to the host, which may be regarded as a split machine. Referring to FIG. 1, a schematic diagram of an application scene in accordance with some embodiments of the present disclosure. FIG. 1 includes a head-mounted display 110. The following embodiment takes the virtual reality software system (all-in-one machine) running on the head-mounted display 110 as an example, and the virtual reality software system running on the host connected to the head-mounted display executes a method for model mapping for a mouse provided by the present disclosure.

In view of the above technical problems, the embodiments of the present disclosure provides a method model mapping for a mouse of a mouse, which acquires data related to the mouse, and then determines target information of the mouse model corresponding to the mouse in a virtual reality system based on the data related to the mouse, wherein the target information of the mouse model in the virtual reality system may be used as initial target information. Meanwhile, movement data of the mouse is acquired in real time, wherein the movement data is used to indicate a movement distance and a movement direction of the mouse. Then, the target information of the mouse model in the virtual reality system is updated based on the movement data of the mouse. In addition, the mouse model is displayed in the virtual reality scene and at the updated target information, so that a mouse model corresponding to the mouse in a real space can be accurately mapped into the virtual reality scene, which is convenient for a user to subsequently use the mouse in the real space for performing an interactive operation efficiently according to the mouse model displayed in the virtual reality scene. According to the present disclosure, the target information of the mouse model is determined based on an operation signal between the mouse and the virtual reality software system, which is not affected by the occlusion problem, and other positioning devices do not need to be installed first, so that it is convenient to implement and use. Specifically, the method for model mapping for the mouse is described in detail hereinafter with reference to one or more specific embodiments.

Figure 2:
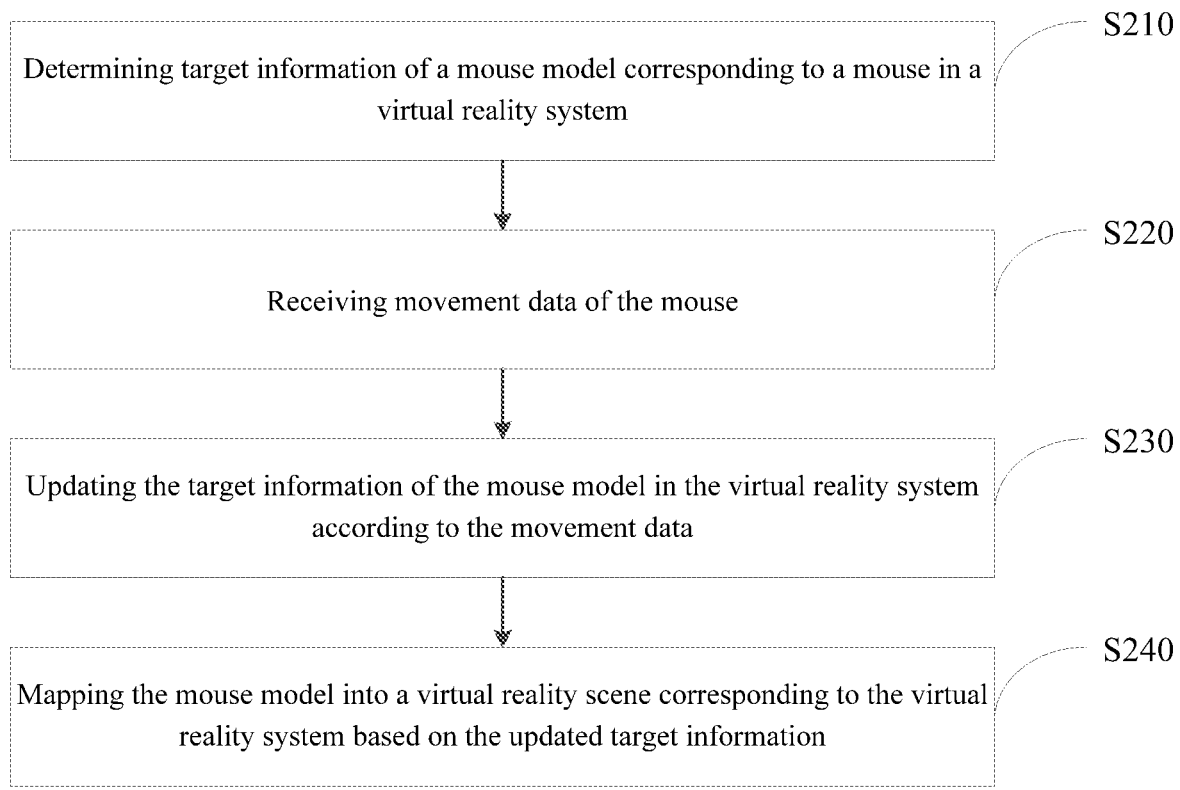
FIG. 2 is a schematic diagram of a method for mapping a mouse model in accordance with some embodiments of the present disclosure.

FIG. 2 is a flow chart illustrating a method for model mapping for a mouse in accordance with some embodiments of the present disclosure, which may be applied to a virtual reality system, and may include the following steps S210 to S240 as shown in FIG. 2.

In some embodiments, the virtual reality software system may be implemented in a head-mounted display, and the virtual reality software system can process received data transmitted by the mouse and return a processing result to a display screen in the head-mounted display, and then the display screen changes display states of various components in the virtual reality scene in real time according to the processing result.

Figure 3A:
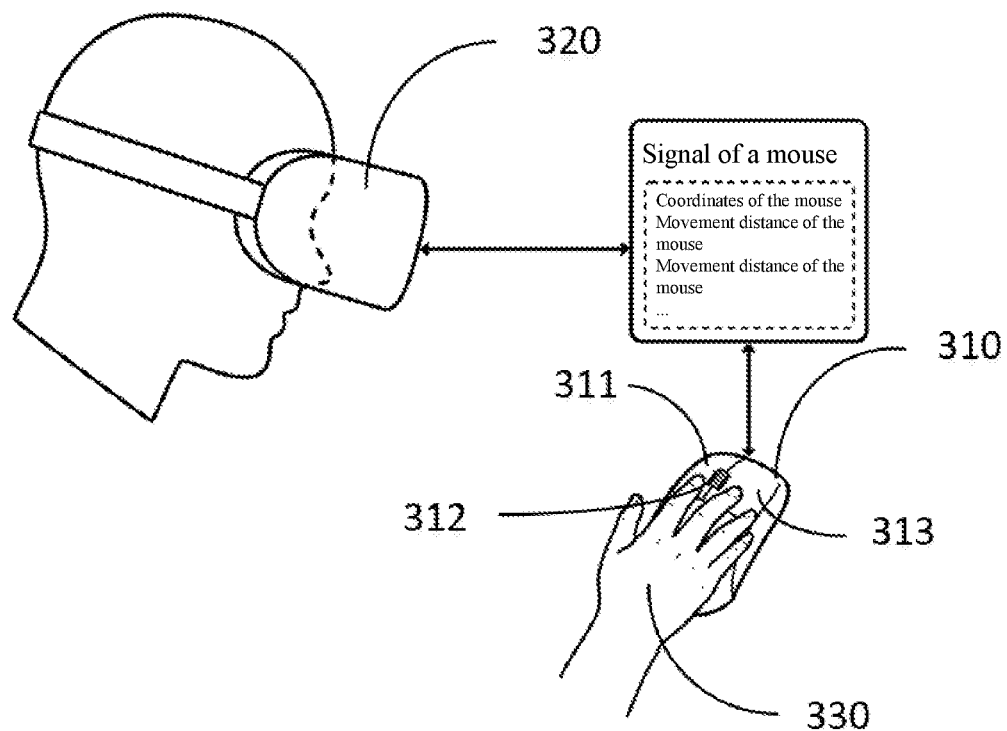
FIG. 3a is a schematic diagram of another application scene in accordance with some embodiments of the present disclosure.
Figure 3B:
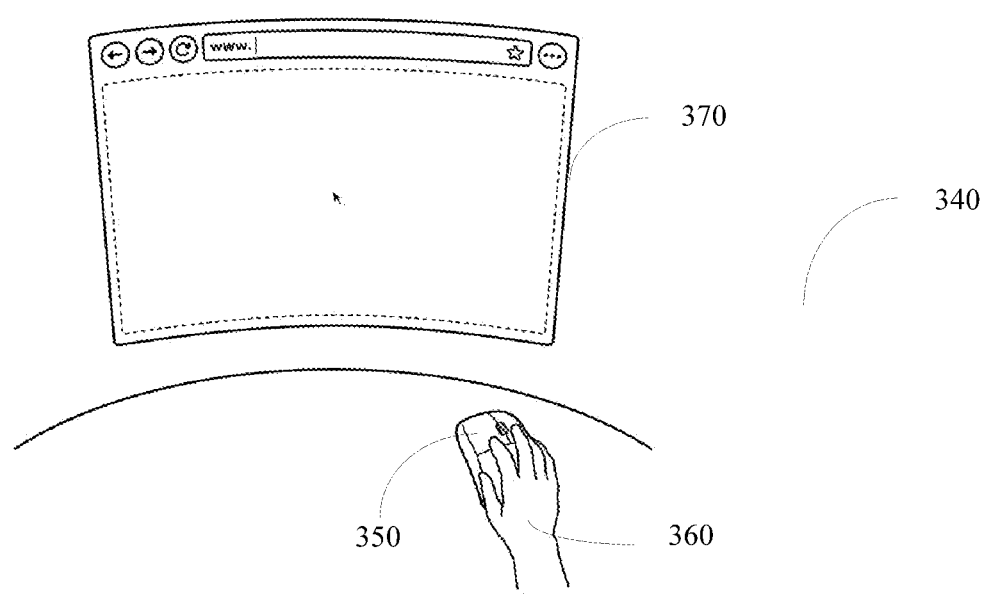
FIG. 3b is a schematic diagram of a virtual reality scene in accordance with some embodiments of the present disclosure.

For example, referring to FIG. 3a, a schematic diagram of another application scene in accordance with some embodiments of the present disclosure is illustrated. FIG. 3a includes a mouse 310, a head-mounted display 320, and a user hand 330. A user wears the head-mounted display 320 on his head, and the user's hand 330 operates the mouse 310. The mouse 310 is connected to the head-mounted display 320. 340 in FIG. 3b is a scene constructed in the head-mounted display 320 in FIG. 3a, which may be referred to as a virtual reality scene 340, that is, a scene that the user wearing the head-mounted display can see. The method in accordance with some embodiments of the present disclosure can map a mouse model 350 corresponding to the mouse 310 to the virtual reality scene 340 constructed by the head-mounted display 320 according to a spatial position and an attitude of the mouse 310 in a real space, so that the user can understand and manipulate the mouse 310 by watching the mouse model 350 displayed in the virtual reality scene 340. In the virtual reality scene 340, an operation of the hand model 360 operating the mouse model 350 and an actual operation of the user hand 330 using the mouse 310 may be synchronized to some extent, which is equivalent to two eyes of the user directly seeing elements in the mouse and carrying out subsequent operations, which improves the user experience and improves an interaction speed. Understandably, the method for mapping the mouse model provided by the following embodiments is illustrated by taking the application scene shown in FIG. 3a as an example.

At S210, target information of a mouse model corresponding to the mouse in a virtual reality system is determined.

Optionally, determining the target information of the mouse model corresponding to the mouse in the virtual reality system may include the following steps: acquiring data related to the mouse. The data related to the mouse may include configuration information of the mouse, and the configuration information may include model information. Before determining the target information of the mouse model corresponding to the mouse in the virtual reality system based on the data related to the mouse, the mouse model corresponding to the mouse may also be determined according to the model information.

In some embodiments, the virtual reality software system acquires the data related to the mouse, wherein the data related to the mouse may include, for example, configuration information of the mouse, an input signal corresponding to the element on the mouse, an image of the input device, and the like. The virtual reality software system may acquire configuration information of the mouse. The configuration information may include model information of the mouse. While distributions of elements set for different models of the mouse and distances between elements are different, wherein the elements may be a key or an identity set on the mouse. The key may include a left key, a right key, a roller wheel, a side key, etc. The identity can be a mouse identity or an identity set on the mouse in advance. Then, a mouse model corresponding to the mouse is selected according to the model of the mouse. The mouse model may be selected from a pre-built model database after comparison and analysis, and the mouse model corresponding to the model number or a three-dimensional model with similar element distribution in the mouse is selected and determined. After determining the mouse model corresponding to the mouse according to the configuration information of the mouse, the virtual reality software system can determine the target information of the mouse model in the virtual reality system based on the input signal of the mouse or the image of the mouse, wherein the target information includes position information and attitude information.

In some embodiments, the head-mounted display 320 shown in FIG. 3a may be equipped with a plurality of cameras, and a space can be constructed based on environmental information obtained by a camera and a positional relationship of the head-mounted display worn on the head of a user. This space may be referred to as a target space. The mouse and the user hand in FIG. 3a are within the determined target space. The position information refers to spatial three-dimensional coordinates (XYZ) of characters in the target space. The attitude information refers to directional attribute information of the characters in the target space, such as a rotation angle, a pitch angle, and a roll angle of the characters in the target space. The spatial three-dimensional coordinates may refer to three-dimensional coordinates in the target space, and the attitude information refers to the attitude in the target space. In some embodiments, the scene displayed in the virtual reality scene is a scene in the target space.

Optionally, determining the target information of the mouse model corresponding to the mouse in the virtual reality system based on the data of the mouse may include determining the target information of the mouse model corresponding to the mouse in the virtual reality system based on the input signal of the mouse.

Optionally, determining the target information of the mouse model corresponding to the mouse in the virtual reality system based on the data of the mouse may further include determining the target information of the mouse model corresponding to the mouse in the virtual reality system based on the image of the mouse.

Optionally, after determining the target information of the mouse model in the virtual reality system, the mouse model is mapped into the virtual reality scene.

At S220, movement data of the mouse may be received.

In some embodiments, the device and the head-mounted display are connected through a connection protocol, such as a Bluetooth protocol or a Universal Serial Bus (USB) connection protocol, and the virtual reality software system running on the head-mounted display may receive movement data of the mouse through the connection protocol. Specifically, when the user moves the mouse, the movement data of the mouse can be obtained through the input signal of the mouse. The mouse may also be a wireless mouse, and the mouse is not limited to a specific type. The virtual reality software system only needs to receive the movement data generated by the mouse connected to the head-mounted display. Specifically, the movement data includes a movement distance and a movement direction of the mouse.

At S230, the target information of the mouse model in the virtual reality system is updated according to the movement data.

In some embodiments, based on S210 and S220, the virtual reality software system may re-determine the target information of the mouse model in the virtual reality system according to the received movement data of the mouse. The target information may be regarded as the relative position information of the moved mouse based on the initial target information, and the mouse model is displayed at the re-determined target information in the virtual reality scene. After determining the initial target information of the mouse model in the virtual reality system, the mouse in the real space may move. In this case, the target information of the mouse model in the virtual reality system can be re-determined according to the movement data of the mouse received by the virtual reality software system based on the initial target information, wherein the target information is determined relative to the initial target information. For example, the determined spatial coordinates (spatial three-dimensional coordinates) in the initial target information corresponding to the mouse are (1,2,3), and the movement data of the mouse indicates that the movement distance of the mouse is 2 and the movement direction of the mouse is along the X axis. In this case, the spatial coordinates of the mouse model in the target information in the virtual reality system are re-determined as (3, 2, 3). At S240, the mouse model is mapped to a virtual reality scene corresponding to the virtual reality system based on the updated target information.

Understandably, based on the above S230, after the target information of the mouse model in the target space is updated, the mouse model is displayed in the virtual reality scene at the re-determined target information, wherein the virtual reality scene shows the scene in the target space.

According to the method for mapping the mouse model in accordance with some embodiments of the present disclosure, the data related to the mouse is acquired, then the target information of the mouse model corresponding to the mouse in the virtual reality system is determined based on the data related to the mouse. Meanwhile, the movement data of the mouse is received in real time, the target information of the mouse model in the virtual reality system is then updated according to the movement data obtained by the input signal of the mouse, and the mouse model is displayed at the updated target information in the virtual reality scene. The method for mapping the mouse model provided by the present disclosure can accurately map the mouse in the real space to the virtual reality scene, and the influence of occlusion is relatively small, so that the user can subsequently use the mouse to perform the interactive operation according to the mouse model in the virtual reality scene effectively.

Figure 4:
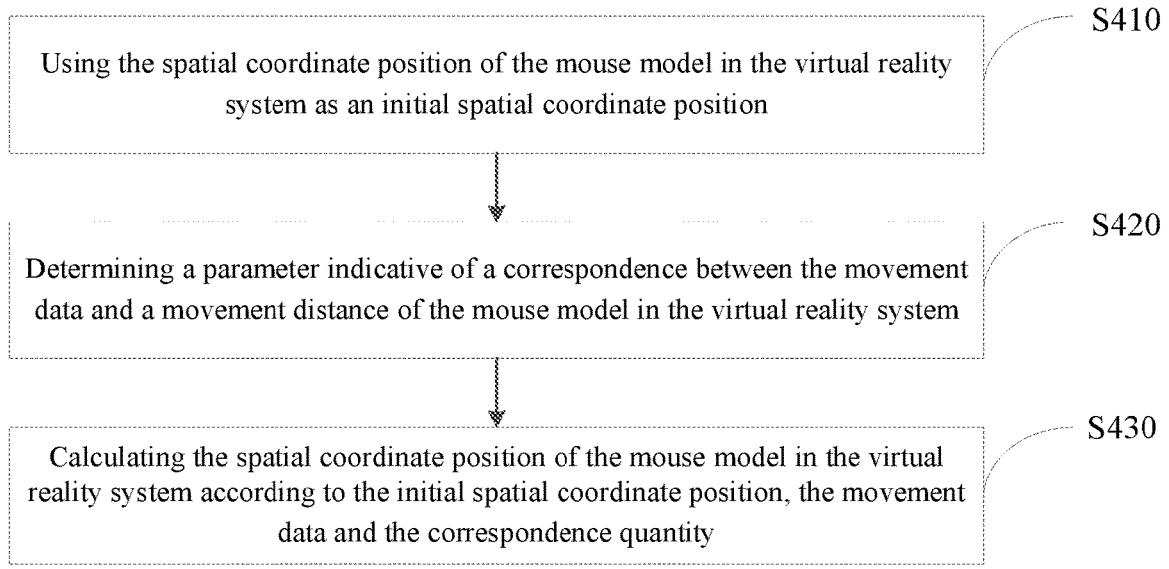
FIG. 4 is a schematic diagram of a method for mapping a mouse model in accordance with some embodiments of the present disclosure.

Based on the above-mentioned embodiments, FIG. 4 is a schematic flow chart of a method for mapping a mouse model in accordance with some embodiments of the present disclosure. The target information includes a spatial coordinate position, and the spatial coordinate position refers to a position of the mouse model in the target space. Optionally, updating the target information of the mouse model in the virtual reality system according to the movement data may include the following steps S410 to S430 as shown in FIG. 4.

At S410, the spatial coordinate position of the mouse model in the virtual reality system is assigned as an initial spatial position.

In some embodiments, the spatial coordinate position of the mouse model in the target information in the virtual reality system calculated above is used as the initial spatial coordinate position, and the initial spatial coordinate position is a reference coordinate referred to by the subsequent movement data. The movement data may be regarded as two-dimensional data, which may include a movement direction and a movement distance, that is, the movement distance and the movement direction of the mouse model based on the initial spatial coordinate position.

Understandably, the virtual reality software system may receive multiple groups of movement data generated when the mouse moves, and the spatial coordinate position and the attitude information of the mouse can be calculated according to the multiple groups of movement data. For the detected spatial coordinate position, the initial spatial coordinate position needs to be given, which is equivalent to giving one coordinate system or coordinate origin of the spatial coordinate position, to clarify a starting point of a movement trajectory of the mouse collected subsequently, and the multiple spatial coordinate positions can represent the movement trajectory of the mouse. The movement trajectory may be a series of spatial coordinate positions after the mouse moves, including translation to the right. If the initial spatial coordinate position is not given, it is impossible to accurately determine where the mouse moves to the right and the specific position after translation. Therefore, it is necessary to determine one initial spatial coordinate position to accurately determine a specific position of the mouse after moving. The initial spatial coordinate position is in the above-mentioned head-centered target space, and the specific position is also in the same target space.

At S420, a parameter indicative of a correspondence between the movement data and the movement distance of the mouse model in the virtual reality system is determined.

In some embodiments, the parameter indicative of the correspondence between the movement distance in the movement data and the movement distance of the mouse model in the virtual reality system is determined. The movement distance in the data is recorded as a first distance, and the movement distance of the mouse model in the virtual reality system is recorded as a second distance. The parameter indicative of the correspondence between the first distance and the second distance may thus be determined. For example, the movement distance in the movement data may be a distance of five units, which is equivalent to the mouse model moving by a distance of one unit. The mouse model and the mouse are synchronized. As such, the mouse also moves by a distance of one unit. In this case, the parameter indicative of the correspondence between the second distance and the first distance is 5.

Optionally, determining the parameter indicative of the correspondence between the movement data and the movement distance of the mouse model in the virtual reality system may include acquiring an operating parameter of the mouse; and determining the parameter indicative of the correspondence between the movement data and the movement distance of the mouse model in the virtual reality system.

Optionally, the parameter indicative of the correspondence between the movement data and the movement distance of the mouse model in the virtual reality system may be determined according to the operating parameter of the mouse set in the virtual reality software system.

Optionally, determining the parameter indicative of the correspondence between the movement data and the movement distance of the mouse model in the virtual reality system, includes: acquiring first target information of a hand model at a first preset feature point in the virtual reality system; determining second target information of the mouse model at the first preset feature point in the virtual reality system according to the first target information; acquiring third target information of the hand model at a second preset feature point in the virtual reality system, and determining fourth target information of the mouse model at the second preset feature point in the virtual reality system according to the third target information; calculating the movement distance of the mouse model in the virtual reality system according to the fourth target information and the second target information; and calculating the parameter indicative of the correspondence according to the movement data and the movement distance.

In some embodiments, according to the movement data, the updated attitude information and movement trajectory of the mouse can be obtained, for example, by acquiring the relevant operating parameter of the mouse set by the virtual reality software system or mapping calibration method. The following description takes the mapping calibration method as an example. The mapping calibration method is to display the two preset feature points in the display screen, which may be specifically recorded as the first preset feature point A and the second preset feature point B. In this case, guidance prompt information may be displayed on the display screen to prompt the user to click point A on the display screen with the left key of the mouse. After the user clicks the point A with the mouse, a cursor of the mouse on the display screen is at the point A, so as to acquire the first target information of a finger at the point A in the hand model in this case and determine the second target information of the mouse model of the left key of the mouse at the point A according to the first target information. Then, the user is prompted to move the mouse to point B, and click the point B with the left key of the mouse, so as to acquire the third target information of the finger at the point B in the hand model in this case and determine the third target information of the left key of the mouse at the point B in the mouse model according to the third target information. Afterwards, the movement distance of the mouse model in the virtual reality system is calculated according to the fourth target information and the second target information. That is, the movement distance of the mouse model is calculated through the positions of the two feature points. Finally, according to the movement data and the calculated movement distance, the corresponding relationship quantity is calculated, for example, according to the first movement data generated when the mouse is pressed at the point A and the second movement data generated when the mouse is pressed at the point B, the movement distance between the first movement data and the second movement data, that is, the movement distance corresponding to the signal of the mouse, is calculated according to the target information of the mouse model at the point A and the point B, so as to calculate a mapping relationship between the movement distance (movement data) of the signal of the mouse and the movement distance of the mouse model in the target space.

At S430, the spatial coordinate position of the mouse model in the virtual reality system is calculated according to the initial spatial coordinate position, the movement data, and the parameter indicative of the correspondence.

In some embodiments, based on S410 and S420, the spatial coordinate position of the mouse model in the virtual reality system is calculated according to the initial spatial coordinate position, the movement data, and the parameter indicative of the correspondence. That is, the updated spatial coordinate position is obtained after the reference point, the correspondence and the movement distance are given.

Optionally, S430 may further include the following steps: calculating a movement offset of the mouse model according to the movement data and the parameter indicative of the correspondence; and calculating the spatial coordinate position of the mouse model in the virtual reality system according to the movement offset and the initial spatial coordinate position.

In some embodiments, the movement offset is calculated according to the movement direction and the movement distance in the movement data and the parameter indicative of the correspondence. For example, the movement direction in the movement data is a direction of the X axis and the movement distance is a distance of ten units, and the movement distance in the movement data is a distance of five units according to the parameter indicative of the correspondence determined above, which is equivalent to the mouse model moving by a distance of one unit, which is also equivalent to the device moving by a distance of one unit. It can be calculated that the movement offset of the mouse model is a distance of two units, and the movement offset can be expressed in the form of (2, 0, 0) three-dimensional coordinates, indicating that the mouse model moves by a distance of two units along a positive direction of the X axis, while the other axes remain unchanged. Then, according to the initial spatial coordinate position and the movement offset of the mouse model determined, the spatial coordinate position of the current mouse model in the virtual reality system is obtained. For example, the initial spatial coordinate position of the mouse model is (2, 2, 2), that is, the XYZ three-dimensional coordinate is (2, 2, 2). Through the initial spatial coordinate position (2, 2, 2) and the movement offset (2, 0, 0), the spatial coordinate position of the current mouse model in the virtual reality system is calculated as (4, 2, 2).

In some embodiments, in the real space, when the user presses or lifts a key on the mouse and scrolls the roller wheel of the mouse, the virtual reality system may receive an input signal when the key is pressed or lifted, and the roller wheel of the mouse is scrolled through the Bluetooth protocol or the Universal Serial Bus (USB) connection protocol. In such embodiments, the virtual reality software system may trigger a corresponding key on the mouse model with the same mouse structure in the virtual reality scene to be pressed or lifted and the roller wheel to be rotated. Thus, the user can operate the mouse in the real space to display the corresponding operation in the virtual reality scene. The user can perform an interactive operation on the interface and object in the virtual reality scene by using the mouse in the real space, which greatly improves the efficiency of interaction.

Optionally, the method further includes updating the initial spatial coordinate position; and correcting a calculation error according to the updated initial spatial coordinate position.

According to the method for mapping the mouse model in accordance with some embodiments of the present disclosure, after the initial spatial coordinate position of the mouse model in the virtual reality scene is determined, the parameter indicative of the correspondence between the movement data of the mouse and the movement distance of the mouse model in the virtual reality system is determined, and the spatial coordinate position of the mouse model in the virtual reality system is re-calculated based on the initial spatial coordinate position and according to the initial spatial coordinate position, the movement data and the parameter indicative of the correspondence, to update the display state of the mouse model in real time, quickly and accurately according to the state of the mouse in the real space.

Figure 5:
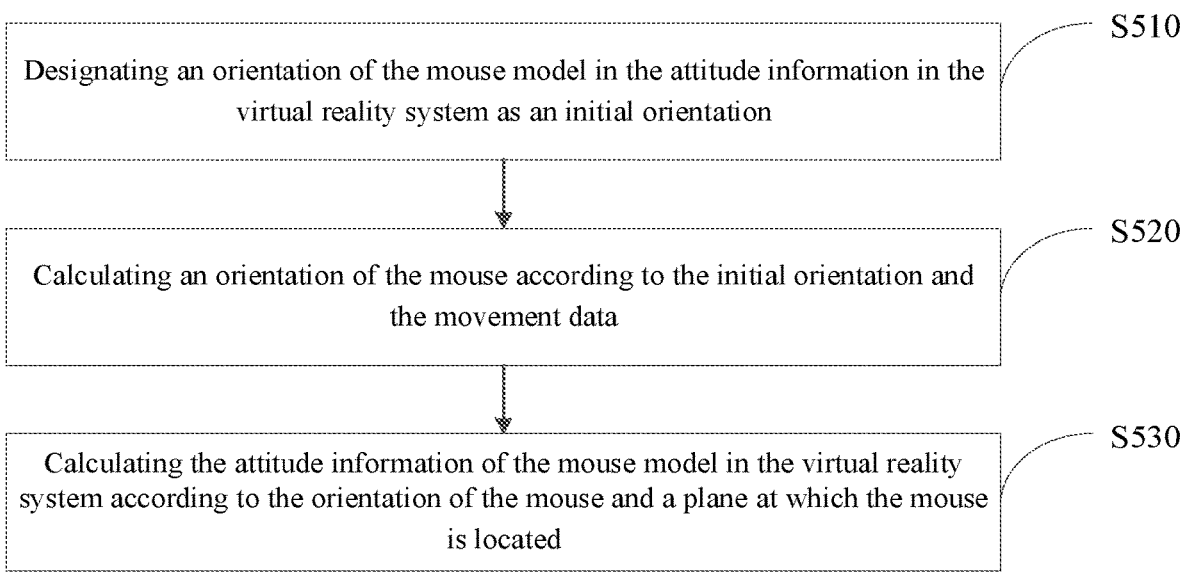
FIG. 5 is a schematic flow chart of a method for mapping a mouse model in accordance with some embodiments of the present disclosure.

Based on the above embodiment, FIG. 5 is a flow chart illustrating a method for virtualizing an input device in accordance with some embodiments of the present disclosure. Optionally, the target information further includes attitude information, wherein the attitude information may be an attitude of the mouse model in the target space. Optionally, updating the target information of the mouse model in the virtual reality system according to the movement data, specifically includes the following steps S510 to S530 as shown in FIG. 5.

At S510, an orientation of the mouse model in the attitude information in the virtual reality system is designated as an initial orientation.

In some embodiments, taking the orientation of the mouse model indicated in the attitude information of the mouse model in the target information in the virtual reality system as the initial orientation, the initial orientation in the target information may be obtained by the image recognition method or the key pressing method.

At S520, an orientation of the mouse is calculated according to the initial orientation and the movement data.

Based on S510 described above, a current orientation of the mouse may be calculated according to the initial orientation, and the movement direction and the movement distance of the mouse in the movement data.

At S530, the attitude information of the mouse model in the virtual reality system is calculated according to the orientation of the mouse and a plane at which the mouse is located.

Understandably, based on S520, the plane at which the mouse is located in the display space may be determined according to the image recognition method or the key pressing method, and then the attitude information of the mouse is determined according to the current orientation of the mouse and the plane at which the mouse is located. Understandably, the mouse is also in the target space, and the virtual reality scene also shows a model of a physical device in the target space, so the attitude information of the mouse is just the attitude information of the mouse model.

According to the method for mapping the mouse model in accordance with some embodiments of the present disclosure, the attitude information of the mouse model in the virtual reality scene is determined by determining the orientation of the mouse and the plane at which the mouse is located, which is not affected by occlusion, and is convenient for implementation, and is also convenient for subsequently use the mouse according to the mouse model in the virtual scene effectively to complete the interactive operation quickly.

Figure 6:
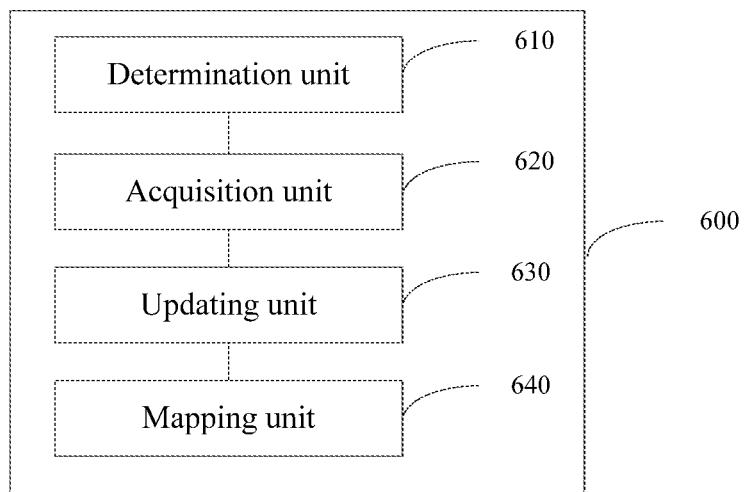
FIG. 6 is a structural schematic diagram of an apparatus for mapping a mouse model in accordance with some embodiments of the present disclosure.

FIG. 6 is a structural schematic diagram of an apparatus for mapping a mouse model in accordance with some embodiments of the present disclosure. The apparatus for mapping a mouse model in accordance with some embodiments of the present disclosure can execute the processing flow provided by the above embodiments of the method for mapping the mouse model. As shown in FIG. 6, the apparatus 600 includes:

a determination unit 610 configured to determine target information of a mouse model corresponding to the mouse in a virtual reality system;

a receiving unit 620 configured to receive movement data of the mouse;

an updating unit 630 configured to update the target information of the mouse model in the virtual reality system according to the movement data; and a mapping unit 640 configured to map the mouse model into a virtual reality scene corresponding to the virtual reality system based on the updated target information.

Optionally, the target information in the apparatus 600 includes a spatial coordinate position.

Optionally, updating the target information of the mouse model in the virtual reality system by the updating unit 630 according to the movement data, is specifically configured to:

designate the spatial coordinate position of the mouse model in the virtual reality system as an initial spatial coordinate position;

determine a parameter indicative of the correspondence between the movement data and a movement distance of the mouse model in the virtual reality system; and calculate the spatial coordinate position of the mouse model in the virtual reality system according to the initial spatial coordinate position, the movement data and the parameter indicative of the correspondence.

Optionally, the calculating the spatial coordinate position of the mouse model in the virtual reality system by the updating unit 630 according to the initial spatial coordinate position, the movement data and the parameter indicative of the correspondence, is specifically configured to:

calculate a movement offset of the mouse model according to the movement data and the parameter indicative of the correspondence; and calculate the spatial coordinate position of the mouse model in the virtual reality system according to the movement offset and the initial spatial coordinate position.

Optionally, to determine the parameter indicative of the correspondence between the movement data and the movement distance of the mouse model in the virtual reality system, the updating unit 630 is specifically configured to:
acquire an operating parameter of mouse; and
acquire an operating parameter of the mouse; and determining the parameter indicative of the correspondence between the movement data and the movement distance of the mouse model in the virtual reality system.

Optionally, to determine the parameter indicative of the correspondence between the movement data and the movement distance of the mouse model in the virtual reality system, the updating unit 630 is specifically configured to:

acquire first target information of a hand model at a first preset feature point in the virtual reality system, and determining second target information of the mouse model at the first preset feature point in the virtual reality system according to the first target information;

acquire third target information of the hand model at a second preset feature point in the virtual reality system, and determining fourth target information of the mouse model at the second preset feature point in the virtual reality system according to the third target information;

calculate the movement distance of the mouse model in the virtual reality system according to the fourth target information and the second target information; and calculate the parameter indicative of the correspondence according to the movement data and the movement distance.

Optionally, the target information in the apparatus 600 includes attitude information.

Optionally, to update the target information of the mouse model in the virtual reality system according to the movement data, the updating unit 630 is specifically configured to:

use an orientation of the mouse model in the attitude information in the virtual reality system as an initial orientation;

calculate an orientation of the mouse according to the initial orientation and the movement data; and calculate the attitude information of the mouse model in the virtual reality system according to the orientation of the mouse and a plane at which the mouse is located.

The model mapping apparatus of the mouse according to the embodiment shown in FIG. 6 may be configured to implement the technical solutions of the foregoing method embodiments, and the implementation principles and the technical effects thereof are similar, which will not be elaborated herein.

Figure 7:
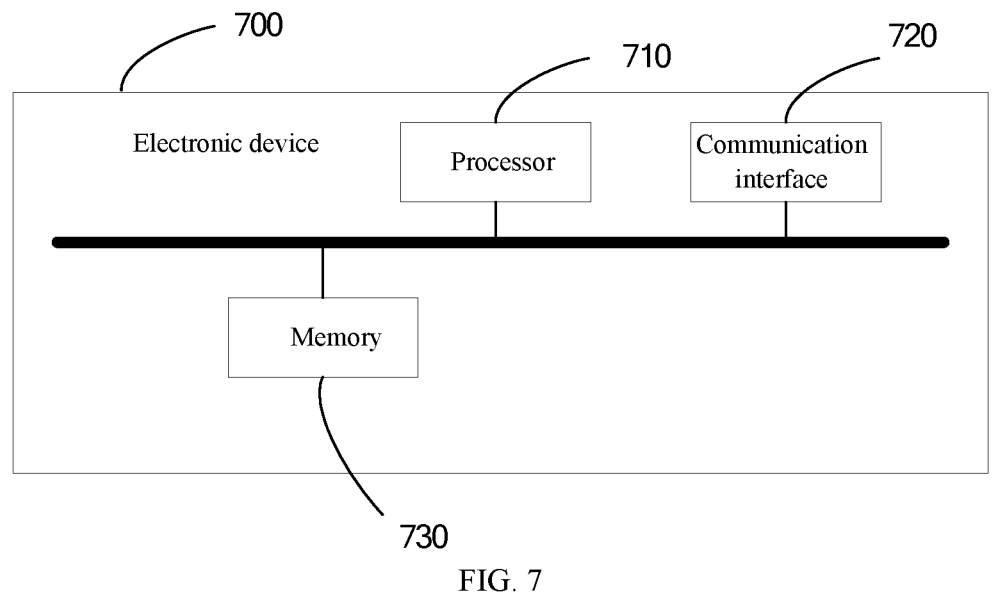
FIG. 7 is a schematic structural diagram of an electronic device in accordance with some embodiments of the present disclosure.

FIG. 7 is a schematic structural diagram of an electronic device in accordance with some embodiments of the present disclosure. The electronic device in accordance with some embodiments of the present disclosure can execute the processing flow provided by the above embodiments. As shown in FIG. 7, the electronic device 700 includes a processor 710, a communication interface 720, and a memory 730. The computer program is stored in the memory 730 and is configured to be executed by the processor 710 to execute the model mapping method for the mouse as mentioned above.

Moreover, the embodiments of the present disclosure further provide a computer readable storage medium storing a computer program thereon, wherein the program is executed by a processor to implement the method for mapping the mouse model as mentioned above.

Moreover, the embodiments of the present disclosure also provides a computer program product including a computer program or instruction, wherein the computer program or instruction, when executed by a processor, implements the method for mapping the mouse model as mentioned above.

It should be noted that relational terms herein such as "first", "second", and the like, are used merely to distinguish one entity or operation from another entity or operation, and do not necessarily require or imply there is any such relationship or order between these entities or operations. Furthermore, the terms "including", "comprising" or any variations thereof are intended to embrace a non-exclusive inclusion, such that a process, method, article, or device including a plurality of elements includes not only those elements but also includes other elements not expressly listed, or also includes elements inherent to such a process, method, article, or device. In the absence of further limitation, an element defined by the phrase "including a . . . " does not exclude the presence of additional identical element in the process, method, article, or device.

The above are only specific embodiments of the present disclosure, so that those skilled in the art can understand or realize the present disclosure. Various modifications to these embodiments will be apparent to those skilled in the art, and the generic principles defined herein may be embodied in other embodiments without departing from the spirit or scope of the present disclosure. Therefore, the present disclosure will not to be limited to these embodiments shown herein but is to be in conformity with the widest scope consistent with the principles and novel features disclosed herein.

What is claimed is:

1. A method for mapping a mouse model, comprising:
   determining target information of the mouse model corresponding to a mouse in a virtual reality system, wherein the target information comprises a spatial coordinate position;
   receiving movement data of the mouse;
   updating the target information of the mouse model in the virtual reality system according to the movement data, comprising:
      designating the spatial coordinate position of the mouse model in the virtual reality system as an initial spatial coordinate position;
      determining a parameter indicative of the correspondence between the movement data and a movement distance of the mouse model in the virtual reality system;
      calculating a movement offset of the mouse model according to the movement data and the parameter indicative of the correspondence; and
      calculating the spatial coordinate position of the mouse model in the virtual reality system according to the movement offset and the initial spatial coordinate position; and
   mapping the mouse model into a virtual reality scene corresponding to the virtual reality system based on the updated target information.

2. The method according to claim 1, wherein determining the parameter indicative of the correspondence between the movement data and the movement distance of the mouse model in the virtual reality system comprises:
   acquiring an operating parameter of the mouse; and
   determining the parameter indicative of the correspondence between the movement data and the movement distance of the mouse model in the virtual reality system according to the operating parameter.

3. The method according to claim 1, wherein determining the parameter indicative of the correspondence between the movement data and the movement distance of the mouse model in the virtual reality system comprises:
   acquiring first target information of a hand model at a first preset feature point in the virtual reality system, and determining second target information of the mouse model at the first preset feature point in the virtual reality system according to the first target information;
   acquiring third target information of the hand model at a second preset feature point in the virtual reality system, and determining fourth target information of the mouse model at the second preset feature point in the virtual reality system according to the third target information;
   calculating the movement distance of the mouse model in the virtual reality system according to the fourth target information and the second target information; and
   calculating the parameter indicative of the correspondence according to the movement data and the movement distance.

4. The method according to claim 1, wherein the target information comprises attitude information, and wherein updating the target information of the mouse model in the virtual reality system according to the movement data comprises:
   designating an orientation of the mouse model in the attitude information in the virtual reality system as an initial orientation;
   calculating an orientation of the mouse according to the initial orientation and the movement data; and
   calculating the attitude information of the mouse model in the virtual reality system according to the orientation of the mouse and a plane at which the mouse is located.

5. An apparatus for mapping a mouse model, comprising:
   a determination unit configured to determine target information of the mouse model corresponding to a mouse in a virtual reality system, wherein the target information comprises a spatial coordinate position;
   a receiving unit configured to receive movement data of the mouse;
   an updating unit configured to update the target information of the mouse model in the virtual reality system according to the movement data, wherein the updating unit is further configured to:
      designate the spatial coordinate position of the mouse model in the virtual reality system as an initial spatial coordinate position;
      determine a parameter indicative of the correspondence between the movement data and a movement distance of the mouse model in the virtual reality system;
      calculate a movement offset of the mouse model according to the movement data and the parameter indicative of the correspondence; and
      calculate the spatial coordinate position of the mouse model in the virtual reality system according to the movement offset and the initial spatial coordinate position; and
   a mapping unit configured to map the mouse model into a virtual reality scene corresponding to the virtual reality system based on the updated target information.

6. The apparatus according to claim 5, wherein the target information comprises attitude information, and wherein, to update the target information of the mouse model in the virtual reality system according to the movement data, the updating unit is further to:
   use an orientation of the mouse model in the attitude information in the virtual reality system as an initial orientation;
   calculate an orientation of the mouse according to the initial orientation and the movement data; and
   calculate the attitude information of the mouse model in the virtual reality system according to the orientation of the mouse and a plane at which the mouse is located.

7. A non-transitory computer readable storage medium storing a computer program thereon, wherein the computer program, when executed by a processor, causing a processor to:
   determine target information of a mouse model corresponding to a mouse in a virtual reality system, wherein the target information comprises a spatial coordinate position;
   receive movement data of the mouse;

update the target information of the mouse model in the virtual reality system according to the movement data; and map the mouse model into a virtual reality scene corresponding to the virtual reality system based on the updated target information, wherein to update the target information of the mouse model in the virtual reality system according to the movement data, the processor is further to:
  designate the spatial coordinate position of the mouse model in the virtual reality system as an initial spatial coordinate position;
  acquire first target information of a hand model at a first preset feature point in the virtual reality system, and determining second target information of the mouse model at the first preset feature point in the virtual reality system according to the first target information;
  acquire third target information of the hand model at a second preset feature point in the virtual reality system, and determining fourth target information of the mouse model at the second preset feature point in the virtual reality system according to the third target information;
  calculate movement distance of the mouse model in the virtual reality system according to the fourth target information and the second target information;
  calculating a parameter indicative of the correspondence according to the movement data and the movement distance; and
  calculate the spatial coordinate position of the mouse model in the virtual reality system according to the initial spatial coordinate position.

8. The non-transitory computer readable storage medium according to claim 7, wherein, to calculate the spatial coordinate position of the mouse model in the virtual reality system according to the initial spatial coordinate position, the movement data, and the parameter indicative of the correspondence, the processor is further to:
  calculate a movement offset of the mouse model according to the movement data and the parameter indicative of the correspondence; and
  calculate the spatial coordinate position of the mouse model in the virtual reality system according to the movement offset and the initial spatial coordinate position.

9. The non-transitory computer readable storage medium according to claim 7, wherein, to determine the parameter indicative of the correspondence between the movement data and the movement distance of the mouse model in the virtual reality system, the processor is further to:
  acquire an operating parameter of the mouse; and
  determine the parameter indicative of the correspondence between the movement data and the movement distance of the mouse model in the virtual reality system according to the operating parameter.

10. The non-transitory computer readable storage medium according to claim 7, wherein the target information comprises attitude information; and wherein to update the target information of the mouse model in the virtual reality system according to the movement data, the processor is further to:
  designate an orientation of the mouse model in the attitude information in the virtual reality system as an initial orientation;
  calculate an orientation of the mouse according to the initial orientation and the movement data; and
  calculate the attitude information of the mouse model in the virtual reality system according to the orientation of the mouse and a plane at which the mouse is located.

* * * * *